United States Patent [19]

Tsuda

[11] 4,148,581
[45] Apr. 10, 1979

[54] SHUTTER OPENING AND CLOSING MECHANISM FOR AN ELECTROGRAPHIC APPARATUS

[75] Inventor: Hiroshi Tsuda, Mitaka, Japan

[73] Assignee: Olympus Optical Company Limited, Tokyo, Japan

[21] Appl. No.: 826,056

[22] Filed: Aug. 18, 1977

[30] Foreign Application Priority Data

Aug. 30, 1976 [JP] Japan ................................ 51-102701

[51] Int. Cl.² ............................................. G03B 27/76
[52] U.S. Cl. ....................................... 355/71; 355/3 R
[58] Field of Search ...................... 355/1, 3 R, 67, 69, 355/71

[56] References Cited

U.S. PATENT DOCUMENTS

| | | | |
|---|---|---|---|
| 3,724,942 | 4/1973 | Gibson et al. | 355/71 X |
| 3,918,971 | 11/1975 | Zweig | 355/3 R X |
| 4,008,954 | 2/1977 | Ogawa et al. | 355/3 R X |

*Primary Examiner*—Fred L. Braun
*Attorney, Agent, or Firm*—Haseltine, Lake & Waters

[57] ABSTRACT

A shutter opening and closing mechanism for an electrographic apparatus comprising a dark box for surrounding a photosensitive screen and provided with an opening through which light flux reflected from a manuscript image is projected onto the photosensitive screen. The opening is closed by a shutter operatively interlocked with a reciprocating exposing and scanning mechanism and becomes open only when a first electrostatic latent image corresponding to the manuscript image is to be produced on the photosensitive screen.

1 Claim, 6 Drawing Figures

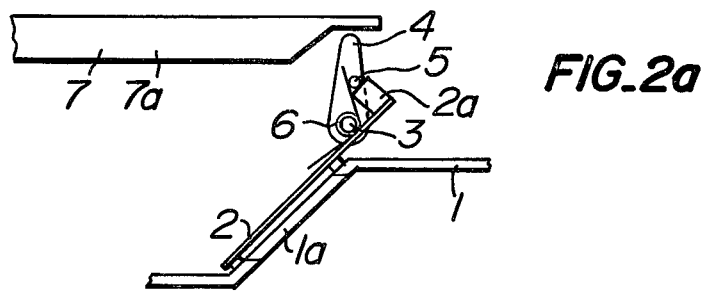
FIG._2a
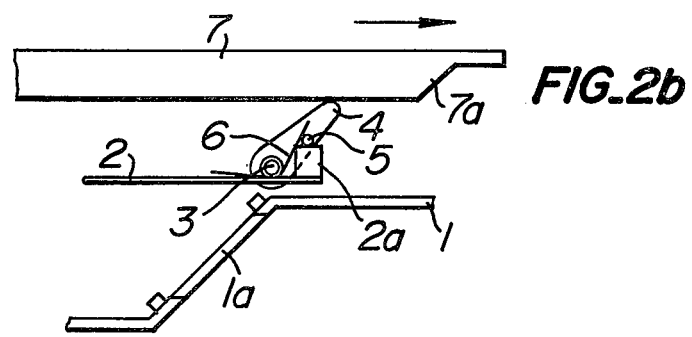
FIG._2b
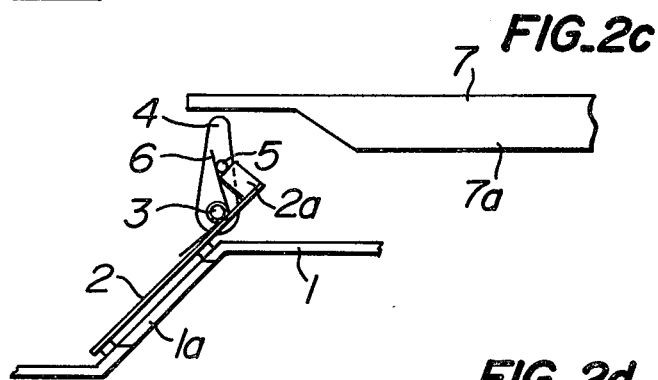
FIG._2c
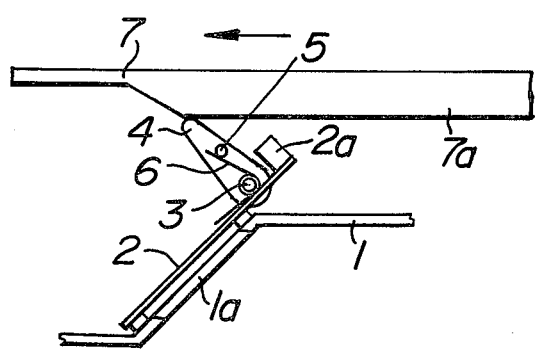
FIG._2d

SHUTTER OPENING AND CLOSING MECHANISM FOR AN ELECTROGRAPHIC APPARATUS

BACKGROUND OF THE INVENTION

This invention relates to a shutter opening and closing mechanism for electrographic apparatus.

Various kinds of electrographic apparatus have been known which make use of a photosensitive screen and in which at first the photosensitive screen is uniformly charged and then a manuscript image is exposed and scanned so as to form a first electrostatic latent image on the photosensitive screen and a flow of corona ions is modulated to transfer the first electrostatic latent image onto a dielectric coated record sheet so as to produce a second electrostatic latent image on the dielectric coated record sheet. Such electrographic apparatus has the advantage that it is possible to reproduce a plurality of copies on the basis of the first electrostatic latent image produced on the photosensitive screen by only one exposure and scanning of the manuscript image, and that, in the case of reproducing a plurality of copies after the first electrostatic latent image has been produced on the photosensitive screen, it is possible to omit the above mentioned steps of uniformly charging the photosensitive screen, exposing and scanning the manuscript image and effecting movements of a reciprocating scanning means such as a reciprocating carriage on which is placed a manuscript or a reciprocating light source. For this purpose, the first electrostatic latent image produced on the photosensitive screen must effectively be maintained for a long time.

A photosensitive screen of a four layer construction has also been known. Such photosensitive screen is composed of an electrically conductive core coated on one side with an insulating layer and electrically conductive layer in the order as mentioned above and coated on the other side with a photoconductive layer. In such photosensitive screen, the first electrostatic latent image is produced on its photoconductive layer. After the first electrostatic latent image has been produced on the photoconductive layer of the photosensitive screen, if the photosensitive screen is exposed again, the first electrostatic latent image corresponding to the manuscript image and produced on the photoconductive layer becomes decayed or eliminated. As a result, in the step of transferring the first electrostatic latent image produced on the photosensitive screen onto the record sheet, if the manuscript placed on the carriage is replaced for another manuscript under such condition that the carriage is not sufficiently covered against the exterior light, the first electrostatic latent image produced on the photosensitive screen becomes decayed or eliminated by the exterior light. Thus, it is impossible to sufficiently shorten the total time of reproducing a plurality of copies.

In order to eliminate the above mentioned drawback, an electrographic apparatus provided with a shutter has been proposed. In such electrographic apparatus, in a light path for projecting a manuscript image onto a photosensitive screen is arranged a shutter adapted to be opened only when a first electrostatic latent image is produced on the photosensitive screen. In such electrographic apparatus, if the first electrostatic latent image corresponding to the manuscript image is produced on the photosensitive screen, such first electrostatic latent image can be effectively maintained for a long time without being decayed nor eliminated even during the intervals of time in which a plurality of copies are reproduced on the basis of the first electrostatic latent image produced on the photosensitive screen. In addition, the manuscript placed on the carriage can be replaced by another manuscript and it is possible to prepare for the next copying operation.

SUMMARY OF THE INVENTION

An object of the invention, therefore, is to provide a shutter opening and closing mechanism particularly useful for the above described electrographic apparatus.

A feature of the invention is the provision, in a shutter opening and closing mechanism for an electrographic apparatus comprising a reciprocating exposing and scanning means for producing a manuscript image on a photosensitive screen so as to produce a first electrostatic latent image corresponding to the manuscript image thereon and means for modulating a flow of corona ions by the first electrostatic latent image so as to produce a second electrostatic latent image on a record sheet, the improvement comprising a dark box for surrounding said photosensitive screen and intercepting exterior light, an opening provided in said dark box and projecting light flux reflected from said manuscript image therethrough onto said photosensitive screen, and a shutter for closing said opening and operatively interlocked with said reciprocating exposing and scanning means so as to open said opening when said first electrostatic latent image is to be produced on said photosensitive screen and to close said opening at intervals of time other than said time of producing said first electrostatic latent image on said photosensitive screen.

BRIEF DESCRIPTION OF THE DRAWINGS

The invention will now be described in greater detail with reference to the accompanying drawings, wherein:

FIGS. 2a and 2d are schematic diagrams illustrating the operation of the shutter opening and closing mechanism shown in FIG. 1.

DESCRIPTION OF THE PREFERRED EMBODIMENTS

Figure 1:
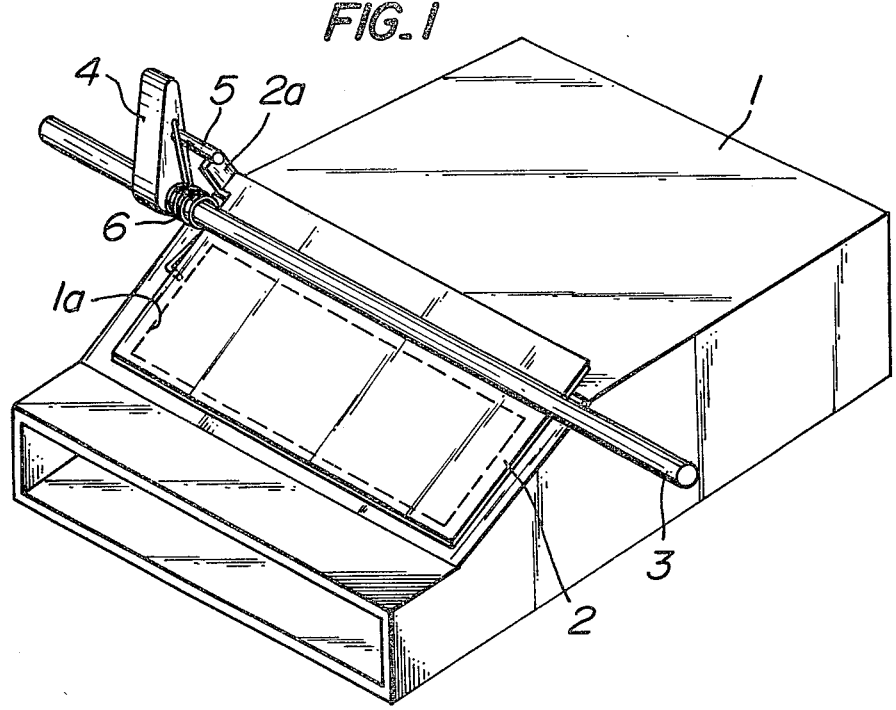
FIG. 1 is a perspective view of one embodiment of a shutter opening and closing mechanism according to the invention.

In FIG. 1 is shown one embodiment of a shutter opening and closing mechanism according to the invention. Referring to FIG. 1, reference numeral 1 designates a dark box secured to the inside of an electrographic apparatus (not shown) and provided therein with a photosensitive screen (not shown). The dark box 1 is provided at its one side with an opening 1a through which light flux reflected from a manuscript placed on a reciprocating carriage is introduced into the dark box 1. The opening 1a is adapted to be closed by a shutter 2 so as to prevent the exterior light from exposing the photosensitive screen. The shutter 2 is secured to a rotary shaft 3 rotatably mounted on the electrographic apparatus body and provided at that end thereof which is opposed with respect to the rotary shaft 3 to the surface for opening and closing the opening 1a with a raised-up portion 2a.

In addition, around that side of the rotary shaft 3 which is located near the raised-up portion 2a is freely and rotatably mounted one end of a lever 4 which is provided at its free end with a pin 5 projecting toward and normally engaged with the raised-up portion 2a. Around that portion of the rotary shaft 3 which is located between the lever 4 and the shutter 2 is wound a torsion spring 6 which operates to urge the pin 5 against the raised-up portion 2a and maintain the lever 4 in its upright position. It is preferable to provide a pad (not shown) fixed to the periphery of the opening 1a so as to relieve shock subjected to the shutter 2 when it closes the opening 1a and prevent leakage of light through a gap formed between the shutter 2 and the opening 1a.

The operation of the shutter opening and closing mechanism shown in FIG. 1 will now be described with reference to FIGS. 2a to 2d. In the present embodiment, a reciprocating motion of a carriage 7 on which is placed a manuscript (not shown) causes the shutter 2 to be opened and closed.

In FIG. 2a is shown the shutter 2 in its condition prior to starting the operation thereof. In this condition, the shutter 2 closes the opening 1a of the dark box 1 and the lever 4 is maintained in its substantially upright position by the action of the torsion spring 6. The electrographic apparatus body is provided with the reciprocating carriage 7 on which is placed the manuscript. The carriage 7 is provided at its lower end with a projection 7a which operates to rotate the lever 4 and hence open and close the shutter 2 in response to the reciprocating motion of the carriage 7.

Now, a print button (not shown) is pushed, the carriage 7 starts its forward movement in a direction shown by the arrow in FIG. 2b. In this forward movement of the carriage 7, the projection 7a causes the lever 4 to rotate in a clockwise direction and the pin 5 is urged against the raised-up portion 2a of the shutter 2 so as to push it downwardly. As a result, the shutter 2 is rotated about the rotary shaft 3 and opened for a given angle as shown in FIG. 2b. As seen from the above, the forward movement of the carriage 7 causes the shutter 2 to open which permits the commencement of exposure and scanning of the manuscript placed on the carriage 7, thereby producing a first electrostatic latent image corresponding to a picture image of the manuscript on the photosensitive screen arranged in the dark box 1.

After the end of the forward movement of the carriage 7, the lever 4 is disengaged from the projection 7a as shown in FIG. 2c to release the shutter 2. As a result, the shutter 2 is rotated in a counterclockwise direction by its own weight to close the opening 1a. In this case, the torsion spring 6 operates to bring the lever 4 into its upright position in the same manner as described with reference to FIG. 2a. As a result, the shutter 2 closes the opening 1a to terminate the exposure and scanning step of the manuscript.

After the end of the exposure and scanning of the manuscript, the carriage 7 starts its backward movement as shown by the arrow in FIG. 2d. In this case, the projection 7a causes the lever 4 to rotate in a counterclockwise direction against the action of the torsion spring 6. That is, the pin 5 projected from the lever 4 is disengaged from the raised-up portion 2a of the shutter 2, so that the shutter 2 remains closed, thereby preventing exterior light from entering the dark box 1. As a result, the first electrostatic latent image produced on the photosensitive screen is effectively maintained.

It is possible to form repeatedly a second electrostatic latent image on a record sheet on the basis of the first electrostatic latent image produced on the photosensitive screen and obtain a desired number of copies.

Figure 3:
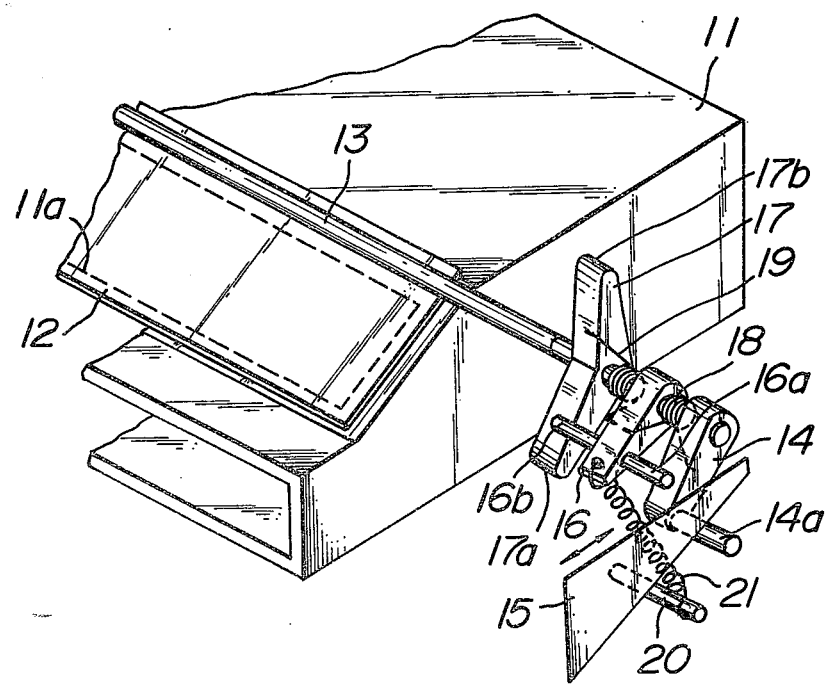
FIG. 3 is a perspective view of another embodiment of a shutter opening and closing mechanism according to the invention.

In FIG. 3 is shown another embodiment of a shutter opening and closing mechanism according to the invention. In the present embodiment, an inclined angle of the shutter in its open position is adjustably changed so as to adjustably change the amount of exposure.

In the present embodiment, a dark box 11 is incorporated into an electrographic apparatus body (not shown) in the same manner as in the embodiment described with reference to FIG. 1. In the dark box 11 is arranged a photosensitive screen (not shown). The dark box 11 is provided with an opening 11a through which light flux reflected from a manuscript placed on a reciprocating carriage is introduced into the dark box 11. When the opening 11a is closed by a shutter 12, all exterior light is prevented from exposing the photosensitive screen. The shutter 12 is secured to a rotary shaft 13 rotably mounted on the electrographic apparatus body (not shown). The rotary shaft 13 is provided at its one end with a first lever 14 secured thereto. The first lever 14 is provided at its free end with a pin 14a. Provision is made for an adjustable member 15 adapted to be moved in two opposed directions as shown by double arrows by means of a handle (not shown) connected to an operating member of the electrographic apparatus for adjusting the concentration of the picture image. The pin 14a cooperates with the adjustable member 15 so as to define the inclined angle of the shutter in its open position. On that portion of the rotary shaft 13 which is located between the first lever 14 and the shutter 12 are freely mounted a second lever 16 and a third bifurcated lever 17 having two arms 17a, 17b in the order as mentioned. A torsion spring 18 is wound around that portion of the rotary shaft 13 which is located between the first and second levers 14, 17. A torsion spring 19 is wound around that portion of the rotary shaft 13 which is located between the second and third levers 16, 17.

The torsion spring 18 operates to urge a pin 16a projected from the free end of the second lever 16 against the side surface of the first lever 14. The torsion spring 19 operates to urge a pin 16b projected from that free end of the second lever 16 which is opposed to the pin 16a against the downwardly extending arm 17a of the third lever 17 so as to maintain the raised-up arm 17b thereof in its upright position. The free end of the second lever 16 is connected through a tension spring 21 to a pin 20 secured to the inside of the electrographic apparatus body. The tension spring 21 operates to urge the pin 16a projected from the second lever 16 against the first lever 14 so as to rotate the rotary shaft 13 and the shutter 12 and close the opening 11a. If the weight of the shutter 12 is sufficient to effectively close the opening 11a, the tension spring 21 may be omitted. As seen from the above, the shutter opening and closing mechanism shown in FIG. 3 is constructed such that the rotation of the third lever 17 about the rotary shaft 13 results in the opening and closing operations of the shutter 12.

The operation of the shutter opening and closing mechanism shown in FIG. 3 will now be described. Similar to the embodiment shown in FIG. 1, the third lever 17 is rotated in response to the reciprocating movements of the carriage so as to effect the opening and closing operations of the shutter 12, so that for the sake of convenience the operation of the present embodiment will be described with reference to FIGS. 2a to 2d. Prior to starting the operation, the shutter 12 is kept closed as shown in FIG. 2a and the raised-up arm 17b is maintained in its upright position. If a print button (not shown) is pushed, the carriage 7 moves in a direction shown by the arrow in FIG. 2b to start its forward movement. In this forward movement of the carriage 7, the projection 7a causes the raised-up arm 17b of the third lever 17 to rotate in a clockwise direction. In this case, the downwardly extending arm 17a of the third lever 17 causes the second lever 16 to rotate through the pin 16b in a clockwise direction against the action of the tension spring 21. If the second lever 16 is rotated in the clockwise direction, the torsion spring 18 causes the first lever 14 to rotate in the clockwise direction to open the shutter 12.

If the pin 14a projecting from the free end of the first lever 14 becomes engaged with the adjustable member 15, which is adapted to be moved in the directions shown by the double arrows and located at any predetermined position, the rotation of the first lever 14 is stopped. From this time, the projection 7a of the carriage 7 causes both the second and third levers 16, 17 only to rotate against the action of the tension spring 21 thus separating the pin 16a projected from the second lever 16 from the first lever 14.

As seen from the above, the adjustable member 15 operates to limit the rotational angle of the first lever 14 and hence limit the inclined angle of the shutter 12 in its open position. If the adjustable member 15 is operatively associated with the handle provided on an operation board of the electrographic apparatus for adjusting the concentration of the manuscript, it is possible to adjust the inclined angle of the shutter 12 in its open position in response to the concentration of the manuscript by operating the adjustable member 15.

During the forward movement of the carriage 7, the photosensitive screen (not shown) arranged in the dark box 11 is exposed to light of any desired brightness to produce a first electrostatic latent image thereon. At the end of the forward movement of the carriage 7, the raised-up arm 17b of the third lever 17 is disengaged from the projection 7a of the carriage 7 and the tension spring 21 causes the raised-up arm 17b of the third lever 17 and the second lever 16 to return to the respective original positions shown in FIG. 3. The pin 16a projecting from the free end of the second lever 16 causes the first lever 14 to return to its start position, thus closing the shutter 12.

If the backward movement of the carriage 7 is started as shown by the arrow in FIG. 2d, the projection 7a of the carriage 7 causes the raised-up arm 17b of the third lever 17 to rotate in the counterclockwise direction. In this case, the downwardly extending arm 17a of the third lever 17 is disengaged from the pin 16b projecting from the second lever 16, so that the second and first levers 16, 14 are not rotated at all, thus maintaining the shutter 12 at its closed position.

At the end of the backward movement of the carriage 7 where the carriage 7 returns to its start position, the raised-up arm 17b of the third lever 17 is disengaged from the projections 7a. Then, the torsion spring 19 operates to return the raised-up arm 17b of the third lever 17 to its upright position shown in FIG. 2a. As a result, during the forward and backward movements of the carriage 7, the first electrostatic latent image produced on the photosensitive screen in the dark box 11 can effectively be maintained for a long time.

As a result, it is possible to repeatedly form a second electrostatic latent image on a record sheet on the basis of the first electrostatic latent image produced on the photosensitive screen in the dark box 11 and obtain a plurality of copies.

As stated hereinbefore, the use of the means described in which on the rotary shaft for rotatably supporting the shutter is freely mounted one end of the lever whose free end is rotated in response to the forward and backward movements of the carriage so as to open and close the shutter permits the use of the shutter opening and closing mechanism which is very simple in construction and reliable in operation. In addition, the use of the adjustable member that can adjust the inclined angle of the shutter in its open position in response to the concentration of the manuscript ensures the operation of the shutter as a diaphragm that limits the exposure of light to that amount of light which is predetermined in correspondence with the concentration of the manuscript to be copied.

As a result, the shutter opening and closing mechanism according to the invention is very simple in construction if compared with the conventional mechanism which is provided with an exposure controlling diaphragm constructed independently of the shutter, takes up less space and makes the mechanism as a whole compact.

The invention is not limited to the above described embodiments only and many alterations and modifications may be made. For example, in the shutter opening and closing mechanism shown in FIG. 1, the opening 1a is closed by the shutter 2 by utilizing its own weight. Provision may be made for a spring operatively engaged with the shutter 2 and urging it against the opening 1a. The use of such spring ensures a reliable closing operation of the shutter 2. In the embodiment described above, the reciprocating movements of the carriage cause the shutter to effect its opening and closing operations. In the case of exposing and scanning the manuscript by moving a light source, the shutter may be opened and closed in response to the reciprocating movements of the light source.

What is claimed is:

1. In a shutter opening and closing mechanism for an electrographic apparatus comprising a reciprocating exposing and scanning means for producing a manuscript image on a photosensitive screen so as to produce a first electrostatic latent image corresponding to the manuscript image thereon, means for modulating a flow of corona ions by the first electrostatic latent image so as to produce a second electrostatic latent image on a record sheet, a dark box for surrounding said photosensitive screen and intercepting exterior light, an opening being provided in said dark box for passage of light flux reflected from said manuscript image therethrough onto said photosensitive screen, and a shutter for closing said opening and operatively interlocked with said reciprocating exposing and scanning means so as to open said opening when said first electrostatic latent image is to be produced on said photosensitive screen and to close said opening at intervals of time other than said time of producing said first electrostatic latent image on said photosensitive screen, the improvement comprising a rotary shaft for rotatably supporting said shutter so as to effect opening and closing movements thereof, a first lever secured to one end of said rotary shaft and biassed in a direction of opening said shutter, an adjustable member engaged with said first lever and limiting an inclined angle of said shutter in its open position to a value selected in response to the concentration of said manuscript image, a second lever freely mounted on said rotary shaft and biassed in a direction to be urged against said first lever, and a third lever freely mounted on said rotary shaft and biassed in a direction to be urged against said second lever, the forward movement of said exposing and scanning means for producing said first electrostatic latent image causing said exposing and scanning means to be engaged with said third lever so as to rotate the third lever in one direction and through said second lever rotating said first lever by an angle defined by said adjustable member, thereby opening said shutter through said rotary shaft by a given angle, said shutter being operative thereby as an exposure controlling diaphragm, the backward movement of said exposing and scanning means causing it to be engaged with said third lever and rotating said third lever only in an opposite direction, thereby maintaining the closed position of said shutter.

* * * * *